United States Patent
Rigdon et al.

(10) Patent No.: US 11,215,490 B2
(45) Date of Patent: Jan. 4, 2022

(54) EXTERNAL FUEL METERING VALVE WITH SHUTTLE MECHANISM

(71) Applicant: Black & Decker Inc., Newark, DE (US)

(72) Inventors: William Rigdon, Baltimore, MD (US); Gary Hill, Red Lion, PA (US); Daniel J. White, Middle River, MD (US); Matthew J. Velderman, Baltimore, MD (US); Derek Marchanti, Nottingham, MD (US)

(73) Assignee: Black & Decker Inc., Newark, DE (US)

( * ) Notice: Subject to any disclaimer, the term of this patent is extended or adjusted under 35 U.S.C. 154(b) by 215 days.

(21) Appl. No.: 16/717,689

(22) Filed: Dec. 17, 2019

(65) Prior Publication Data
US 2020/0124458 A1    Apr. 23, 2020

Related U.S. Application Data

(63) Continuation of application No. 15/700,717, filed on Sep. 11, 2017, now Pat. No. 10,557,738.

(51) Int. Cl.
*B25C 1/08* (2006.01)
*G01F 11/36* (2006.01)
(Continued)

(52) U.S. Cl.
CPC .............. *G01F 11/36* (2013.01); *B25C 1/08* (2013.01); *F02M 61/045* (2013.01);
(Continued)

(58) Field of Classification Search
CPC .. B25C 1/00; B25C 1/08; B25C 1/008; B25C 1/045; B25C 1/047; B05B 1/3026;
(Continued)

(56) References Cited

U.S. PATENT DOCUMENTS 3,568,652 A   3/1971  Ahlen et al.
3,764,044 A   10/1973 Pajak
(Continued)

FOREIGN PATENT DOCUMENTS

| EP | 1186553 A2 | 3/2002 |
|----|-----------|--------|
| WO | 2009051196 A1 | 4/2009 |
| WO | 2012083558 A1 | 6/2012 |

OTHER PUBLICATIONS

International Search Report and Written Opinion for International Application No. PCT/US2018/045826, dated Oct. 17, 2018, 7 pages.

*Primary Examiner* — Scott A Smith
(74) *Attorney, Agent, or Firm* — Brake Hughes Bellermann LLP

(57) ABSTRACT

A handheld combustion powered fastening tool may include a driving system that drives fasteners into workpieces in response to combustion of fuel by the driving system. A fuel delivery system may supply fuel to the driving system. The fuel delivery system may include a fuel canister storing liquid fuel, such as liquid hydrocarbons such as propane, and a fuel metering valve supplying a previously set amount, or volume, of fuel from the fuel canister to the driving system for combustion.

20 Claims, 12 Drawing Sheets

(51) Int. Cl.

| | | |
|---|---|---|
| *F02M 63/00* | (2006.01) | |
| *F16K 31/122* | (2006.01) | |
| *F16K 11/07* | (2006.01) | |
| *F16K 17/10* | (2006.01) | |
| *F17C 13/04* | (2006.01) | |
| *F02M 61/04* | (2006.01) | |
| *B25C 1/00* | (2006.01) | |

(52) U.S. Cl.
CPC ..... *F02M 63/0078* (2013.01); *F16K 11/0712* (2013.01); *F16K 17/10* (2013.01); *F16K 31/1226* (2013.01); *F17C 13/04* (2013.01); *B25C 1/008* (2013.01); *F17C 2201/058* (2013.01); *F17C 2205/0373* (2013.01); *F17C 2270/0763* (2013.01)

(58) Field of Classification Search
CPC ..... B05B 9/0805; B05B 11/005; B65D 83/14; B65D 83/54; B65D 83/44; B65D 83/48; B65D 83/75; B65D 83/207; F16K 17/00; F16K 17/10; F16K 17/168; G01F 11/36; F17C 13/04; F17C 2201/0104; F17C 2201/058; F17C 2205/0373; F17C 2205/0382; F17C 2270/0763
USPC ............. 227/9, 8, 10; 222/402.1; 123/46 SC
See application file for complete search history.

(56) References Cited

U.S. PATENT DOCUMENTS

| | | | |
|---|---|---|---|
| 3,850,359 | A | 11/1974 | Obergfell |
| 3,875,965 | A | 4/1975 | Peters |
| 3,943,974 | A | 3/1976 | Connelly et al. |
| 4,026,325 | A | 5/1977 | Loveless |
| 4,187,884 | A | 2/1980 | Loveless et al. |
| 4,207,924 | A | 6/1980 | Peters |
| 4,405,072 | A | 9/1983 | Kindle et al. |
| 4,483,280 | A | 11/1984 | Nikolich |
| 4,483,474 | A | 11/1984 | Nikolich |
| 4,717,060 | A | 1/1988 | Cotta |
| 5,383,580 | A | 1/1995 | Winder et al. |
| 5,385,303 | A | 1/1995 | Gosselin et al. |
| 5,513,674 | A | 5/1996 | Frisch |
| 5,680,980 | A | 10/1997 | Robinson |
| 5,762,319 | A | 6/1998 | Kopp |
| 5,860,580 | A | 1/1999 | Velan et al. |
| 6,006,704 | A | 12/1999 | Phillips |
| 6,095,182 | A | 8/2000 | Warby |
| 6,302,297 | B1 | 10/2001 | Richardson et al. |
| 6,371,338 | B1 | 4/2002 | Klein et al. |
| D457,811 | S | 5/2002 | Vanstaan et al. |
| 6,419,168 | B1 | 7/2002 | Thieleke et al. |
| 6,786,378 | B2 | 9/2004 | Wagdy et al. |
| 7,445,136 | B2 | 11/2008 | Lin |
| 7,571,841 | B2 | 8/2009 | Gibson et al. |
| 7,591,249 | B2 | 9/2009 | Wagdy et al. |
| D633,922 | S | 3/2011 | Shea et al. |
| 8,033,432 | B2 | 10/2011 | Pardonge et al. |
| 8,967,209 | B2 | 3/2015 | Ho et al. |
| 9,126,212 | B2 | 9/2015 | Pirshafiey |
| 9,206,918 | B2 | 12/2015 | Lin et al. |
| 10,557,738 | B2 * | 2/2020 | Rigdon ............... F16K 31/1226 |
| 2004/0206798 | A1 | 10/2004 | Robinson |
| 2005/0230451 | A1 | 10/2005 | Vanstaan et al. |
| 2006/0011665 | A1 | 1/2006 | Garner et al. |
| 2006/0060614 | A1 | 3/2006 | Garner et al. |
| 2006/0222518 | A1 | 10/2006 | Oda et al. |
| 2007/0251967 | A1 | 11/2007 | Taylor et al. |
| 2008/0000451 | A1 | 1/2008 | Shea et al. |
| 2008/0035214 | A1 | 2/2008 | McCormack et al. |
| 2008/0110953 | A1 | 5/2008 | Gibson et al. |
| 2010/0037961 | A1 | 2/2010 | Tysver et al. |
| 2010/0155432 | A1 | 6/2010 | Christianson et al. |
| 2011/0101037 | A1 | 5/2011 | Ghavami-Nasr et al. |
| 2011/0204118 | A1 | 8/2011 | Moeller et al. |
| 2011/0248083 | A1 | 10/2011 | Bonner et al. |
| 2012/0132690 | A1 | 5/2012 | Dittrich et al. |
| 2012/0267417 | A1 | 10/2012 | Vanstaan et al. |
| 2014/0175143 | A1 | 6/2014 | Vanstaan et al. |
| 2014/0263417 | A1 | 9/2014 | Hanson et al. |
| 2016/0004257 | A1 | 1/2016 | Fliess et al. |
| 2016/0059399 | A1 | 3/2016 | Wong et al. |
| 2017/0144285 | A1 | 5/2017 | Shea et al. |
| 2019/0078921 | A1 * | 3/2019 | Rigdon .................... B25C 1/08 |
| 2019/0107254 | A1 | 4/2019 | Rigdon et al. |

* cited by examiner

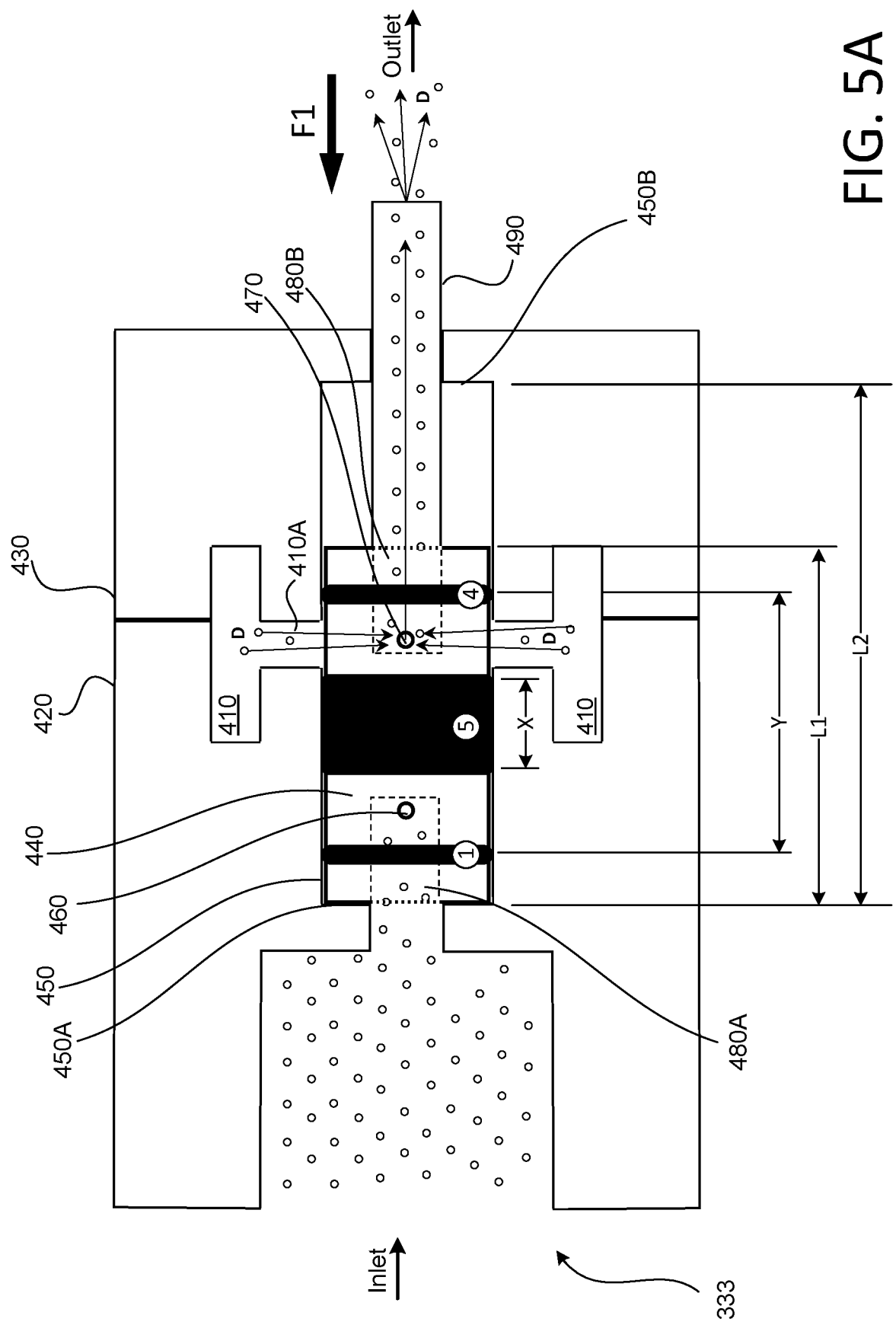

EXTERNAL FUEL METERING VALVE WITH SHUTTLE MECHANISM

CROSS REFERENCE TO RELATED APPLICATIONS

This application is continuation of U.S. application Ser. No. 15/700,717, filed on Sep. 11, 2017, now U.S. Pat. No. 10,557,738, the disclosure of which is incorporated by reference herein in its entirety.

FIELD

This document relates, generally, to a valve, and in particular, to fuel metering valve for a handheld power tool.

BACKGROUND

Power tools, and in particular, power tools used for fastening, may drive a fastener from the tool and into a workpiece in response to power supplied to the fastening tool. Power may be supplied to the fastening tool by, for example, an electrical power source supplying power to the tool through a cord, a compressed air source supplying compressed air to the tool through a hose, a battery supplying stored electrical power to the tool, and the like. Fastening tools driven by electrical power and/or compressed air may operate, essentially, as long as a source of power is available. However, the use of fastening tools driven by electrical power and/or compressed air may, in some circumstances, be cumbersome due to the attachment of the tool to the cord and/or the hose supplying power to the tool, and/or may be limited by the availability of the electrical power and/or compressed air within the range of the tool afforded by the length of the cord and/or the hose. Thus, use of these types of corded tools may also be inconvenient when compared to a cordless tool providing the same capability. For example, use of a battery to supply power to the fastening tool may eliminate the need for a cord or hose attachment of the tool to the power source. However, fastening tools driven by power supplied by a battery may have a relatively limited operating period within the life of the battery, and may be relatively heavy and less nimble. Cordless, combustion powered tools may provide a favorable alternative to corded and/or battery powered tools, due to combination of power, runtime, and lightweight ergonomics.

SUMMARY

In one aspect, an external fuel metering valve may include a main valve body, a valve cap coupled to the main valve body, and a chamber. A first portion of the chamber may be defined in the main valve body, and a second portion of the chamber may be defined in the valve cap, axially aligned with the first portion. The valve may also include a control space including a port providing for fluid communication between the control space and the chamber, and a shuttle movably positioned in the chamber. The shuttle may include an inlet flow passage in fluid communication with an inlet of the main valve body, and an outlet flow passage in fluid communication with an outlet of the valve cap. A plurality of seals may each be positioned on a corresponding outer circumferential portion of the shuttle so as to selectively engage a corresponding inner peripheral portion of the chamber. In a first position of the shuttle in the chamber, a discharge flow path from the control space through the outlet flow passage and the outlet of the valve cap is open. In a second position of the shuttle in the chamber, a filling flow path from the inlet of the main valve through the inlet flow passage and into the control space is open.

In another aspect, a combustion powered fastening tool may include a housing, a driving system included in the housing, and a fuel delivery system configured to supply fuel to the driving system. The fuel delivery system may include a fuel canister, and an external fuel metering valve externally coupled to the fuel canister. The external fuel metering valve may include a main valve body, a valve cap coupled to the main valve body, a cylindrical chamber defined within the main valve body and the valve cap, a control space defined in at least one of the main valve body or the valve cap, the control space being in fluid communication with the chamber, a shuttle movably installed in the chamber, an inlet flow passage at a first end portion of the shuttle, the inlet flow passage providing for fluid communication between the fuel canister and the control space, and an outlet flow passage at a second end portion of the shuttle, the outlet flow passage providing for fluid communication between the control space and an outlet of the valve. In a first position of the shuttle in the chamber, a discharge flow path from the control space through the outlet flow passage and the outlet of the valve cap is opened in response to an external force, and a filling flow path from an inlet of the main valve through the inlet flow passage and into the control space is closed. In a second position of the shuttle in the chamber, the filling flow path is opened to the control space, and the discharge flow path is closed in response to a differential between pressure exerted on the shuttle and a lack of pressure at an outlet stem of the valve.

The details of one or more implementations are set forth in the accompanying drawings and the description below. Other features will be apparent from the description and drawings, and from the claims.

BRIEF DESCRIPTION OF THE DRAWINGS

FIGS. 5A-5C illustrate fuel flow through an example fuel metering valve with a shuttle mechanism, in accordance with implementations described herein.

DETAILED DESCRIPTION

A combustion powered tool, in accordance with implementations described herein, may be driven by the combustion of fuel, for example, a liquid fuel, such as a liquid hydrocarbon fuel, contained in a fuel cell, or fuel canister, received in a housing of the tool and/or coupled to the housing of the tool. In a combustion powered tool, a valve assembly, in accordance with implementations described herein, may dispense a previously defined amount, or volume, of liquid fuel from a fuel canister of the tool into a combustion chamber of the tool. The previously defined amount, or the previously defined volume, which may be determined by the internal geometry of a control space of the valve assembly, may provide for combustion of the fuel to generate a required driving force for successful operation of the tool. In some implementations, this may include a metering, or measuring, of the fuel supplied to the combustion chamber by the valve assembly, to provide a defined amount, or volume, of fuel for combustion.

A valve assembly, including a fuel delivery valve, or a fuel metering valve, coupled to a fuel canister, in accordance with implementations described herein, may provide for the controlled fluid volume release of fuel, such as, for example, a hydrocarbon fuel such as, for example, propane, in particular, a combination of liquid propane and propane gas. This controlled fluid volume release of fuel for combustion may ensure the generation of a required amount of driving force for consistent operation of the tool.

Figure 1A:
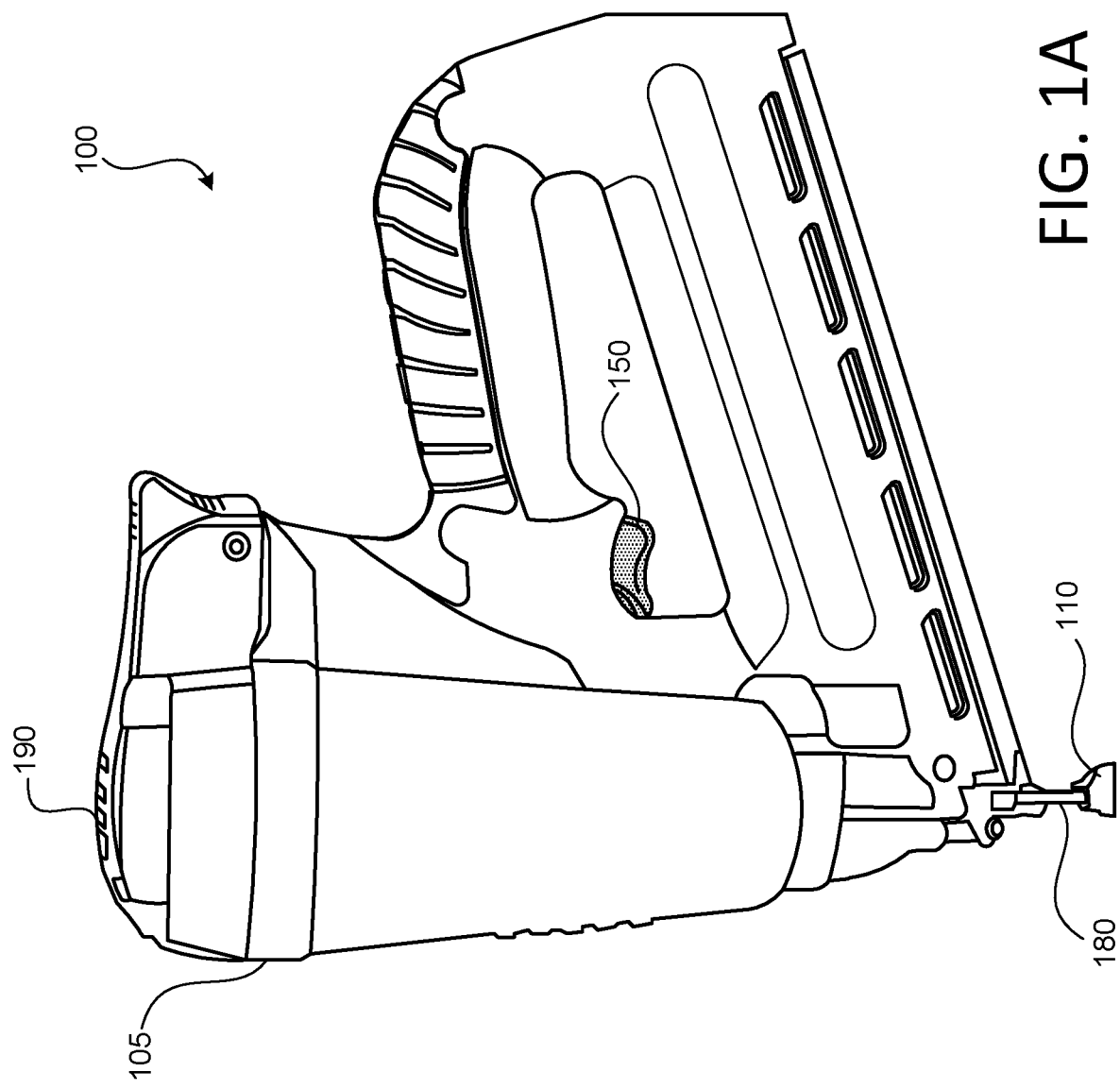
FIG. 1A is a perspective view of an example combustion-powered tool.
Figure 1B:
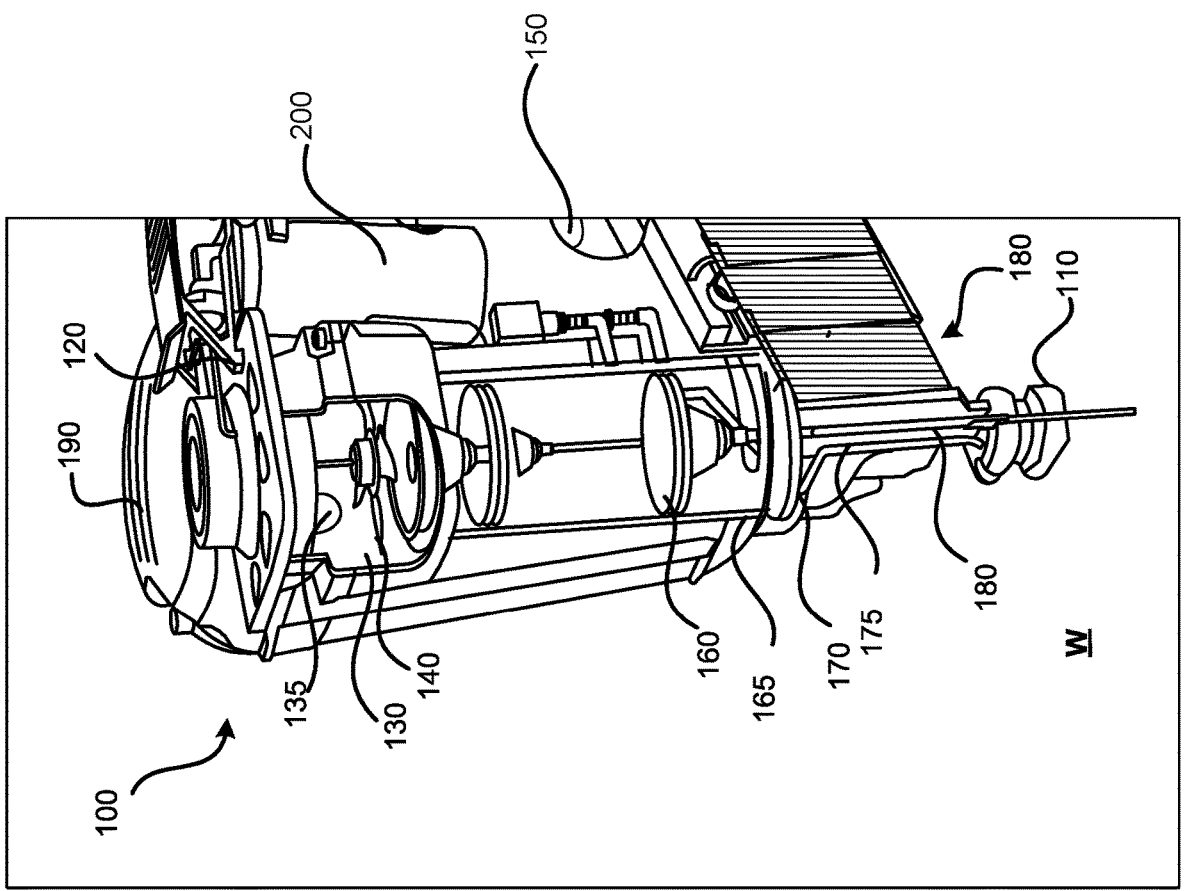
FIG. 1B is cutaway perspective view of the tool shown in FIG. 1A, in accordance with implementations described herein.

An implementation of an example power tool is shown in FIGS. 1A and 1B. A handheld fastening tool 100, and in particular, a nailing tool, is illustrated in the example shown in FIGS. 1A and 1B, simply for ease of discussion and illustration. However, the principles to be described herein may be applied to other types of combustion powered tools, such as, for example, other types of fastening tools, including, for example, riveting tools, stapling tools, and the like. The principles to be described herein may be applied to other types of tools, in addition to fastening tools, such as, for example, impact tools, demolition tools, crimping tools, cutting tools, and the like.

The example fastening tool 100 shown in FIGS. 1A and 1B includes a housing 105, and a driving system configured to drive a fastener into a workpiece W. The driving system operates in response to fuel delivered to the driving system by a fuel delivery system, and combustion of the fuel by the driving system. In operation, a nose 110 of the example fastening tool 100 may be positioned against the workpiece W, for example, at a position on the workpiece W corresponding to intended placement of a fastener 180. Compression of the nose 110 against the workpiece W may cause closure of a compression chamber 130, and delivery of fuel from a fuel canister 200 into the combustion chamber 130. The fuel may be dispensed from the canister 200 as a fluid, but may vaporize upon release. As it enters thru the tool inlet and into the combustion chamber 130, rotation of a fan 140 may mix the vaporized fuel with oxygen from the air. In this state, actuation of the trigger 150 may transmit an electronic pulse to a spark plug 135, igniting the fuel-air mixture in the combustion chamber 130. Reaction of the fuel-air mixture in the combustion chamber 130 may drive movement of a piston 160 (for example, in a downward direction, in the orientation illustrated in FIGS. 1A and 1B) within a cylinder 165. The movement of the piston 160 may in turn drive a driver blade 170, attached to a bottom portion of the piston 160, toward a fastener 180 (of the plurality of fasteners 180) received in a channel 175, positioned at the end of the driver blade 170. The movement of the driver blade 170 into the channel 175 (in response to the corresponding movement of the piston 160) may drive the fastener 180 out of the channel 175 and into the workpiece W.

At the end of the piston stroke, a discharge of exhaust through an exhaust port 190 helps relieve pressure from the piston 160, and may cause a retracting movement of the piston 160 in the cylinder 165 as it cools and a thermal vacuum is created. The return movement of the driver blade 170 out of the channel 175 will allow another fastener 180, of the plurality of fasteners 180, to then be released or moved into the channel 175. Removal of actuation pressure from the nose 110 (by, for example, movement of the tool 100 away from the surface of the workpiece W) may allow the combustion chamber 130 to be opened and remaining exhaust to be released and fresh air to be introduced. The subsequent cooling of the combustion chamber 130 with fresh air may also be assisted by the fan 140.

In some implementations, the example fastening tool 100 may include a valve assembly that selectively supplies fuel from the fuel canister to the tool 100, for operation of the tool 100 as described above. In some implementations, the valve assembly may include a first valve 300 internally coupled in the fuel canister 200, and a second valve 400 externally coupled to the fuel canister 200. In implementations including the first valve, the first valve 300 may dispense fuel from the fuel canister 200 through a coupling device 500. In some implementations, an internal structure of the first valve 300 may be such that fuel may be dispensed from the fuel canister 200 in a plurality of different orientations and/or positions of the tool 100 and/or canister 200 (for example, in both an upright position of the tool 100 and/or the canister 200 and an inverted position of the tool 100 and/or the canister 200), such that the fastening tool 100 is substantially continuously operable in a plurality of different orientations. Spring loaded or poppet valves may be included in the coupling device 500, but an external fuel delivery valve 400, or an external fuel metering valve 400 can dispense, deliver, or discharge, a controlled amount, or volume, of fuel to the combustion chamber 130 for combustion and driving of the tool 100, and in particular, for driving of the piston 160, as described above. A fuel metering valve 400 externally coupled to a fuel canister 200, in accordance with implementations described herein, may allow for a series of controlled volumes of fuel released to the tool 100 in response to a corresponding series of actuation forces. These metered releases of fuel to the tool 100 may be repeated until the canister 200 is substantially empty.

In some implementations, the amount, or volume, of fuel metered into the combustion chamber 130 may be controlled based on one or more factors such as, for example, internal geometry of the fuel metering valve 400 including, for example, a volume of the control space in which fuel is held/staged prior to discharge, an amount of open time of the valve 400, a fuel flow rate/discharge rate of the fuel delivery valve 400, and other such factors. In some implementations, the fuel metering valve 400 may be mechanically operable from an actuation mechanism (for example, the nose 110 or the trigger 150) included in the tool. An external metering valve stem 490 may be depressed by an actuation mechanism 120 in the tool 100. A plurality of different types of actuation mechanisms may exist for similar tools, but do not substantially change the valve mechanism described herein.

Figure 2A:
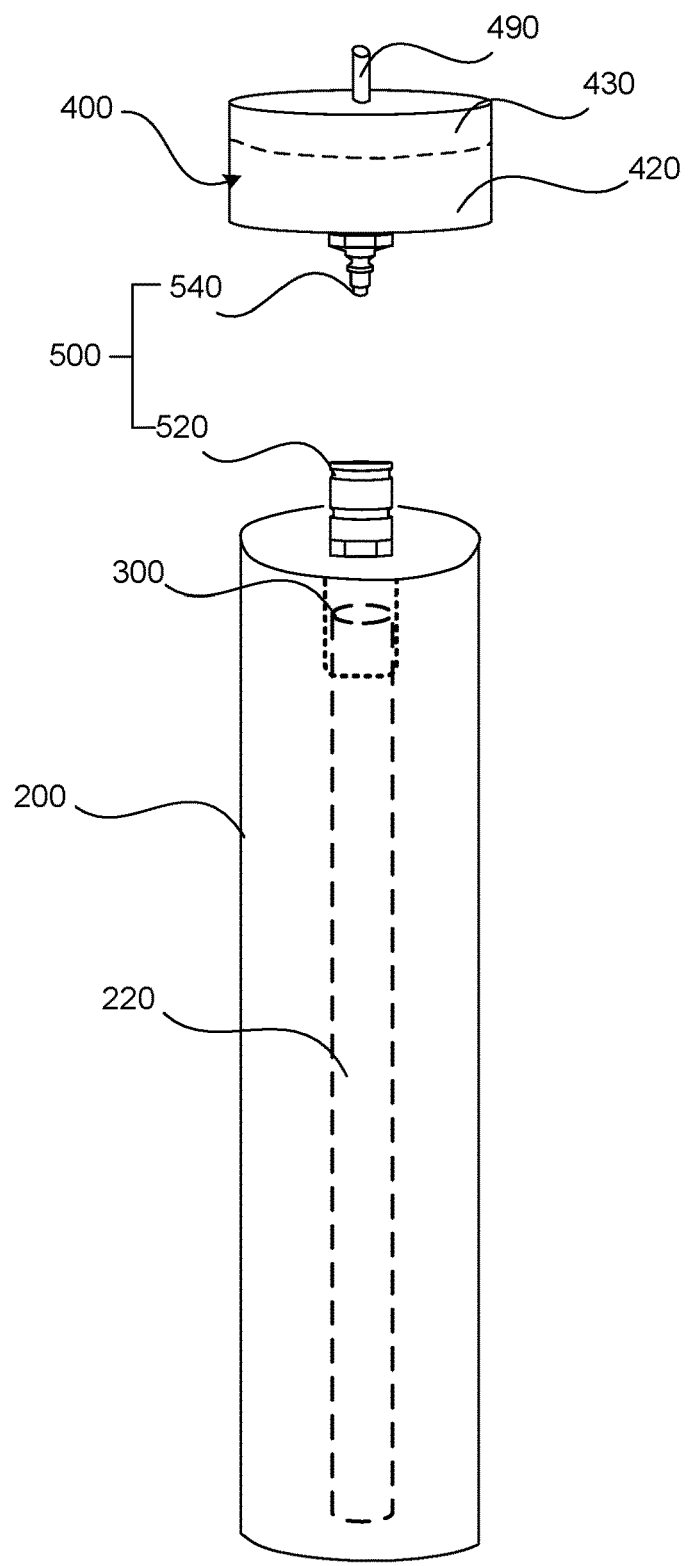
FIGS. 2A-2B illustrate an example valve assembly coupled to an example fuel canister, in accordance with implementations described herein.
Figure 2B:
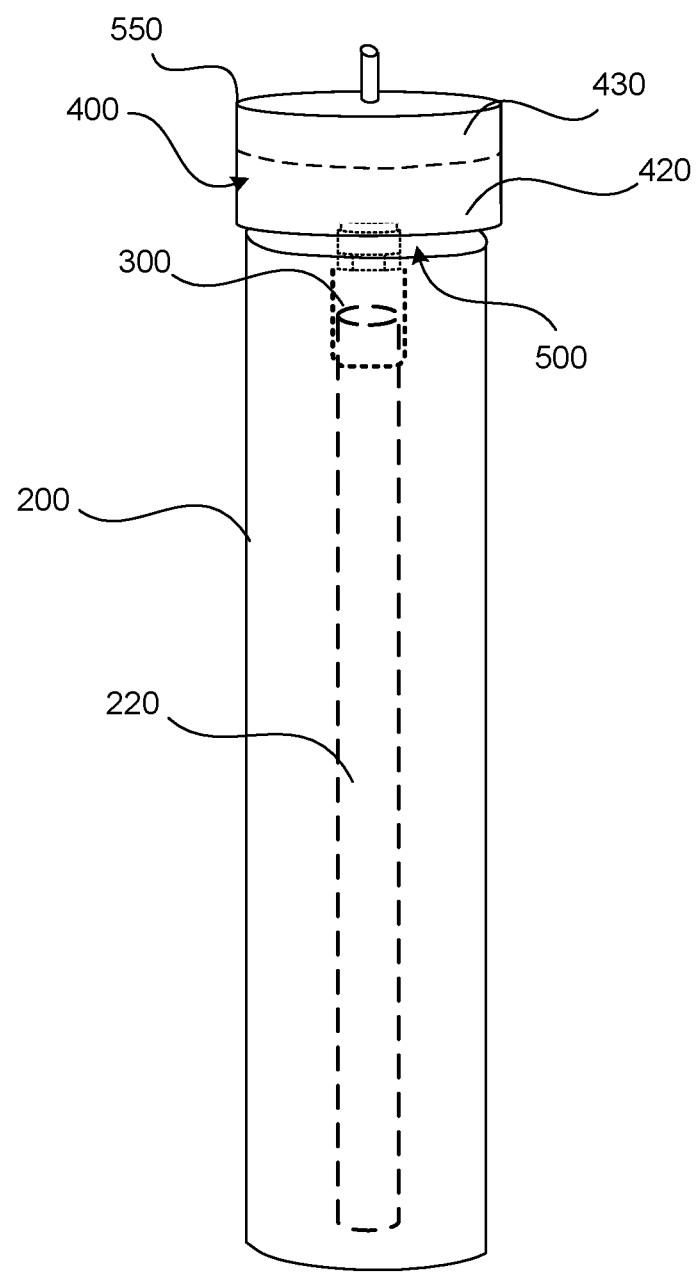
Figure 3:
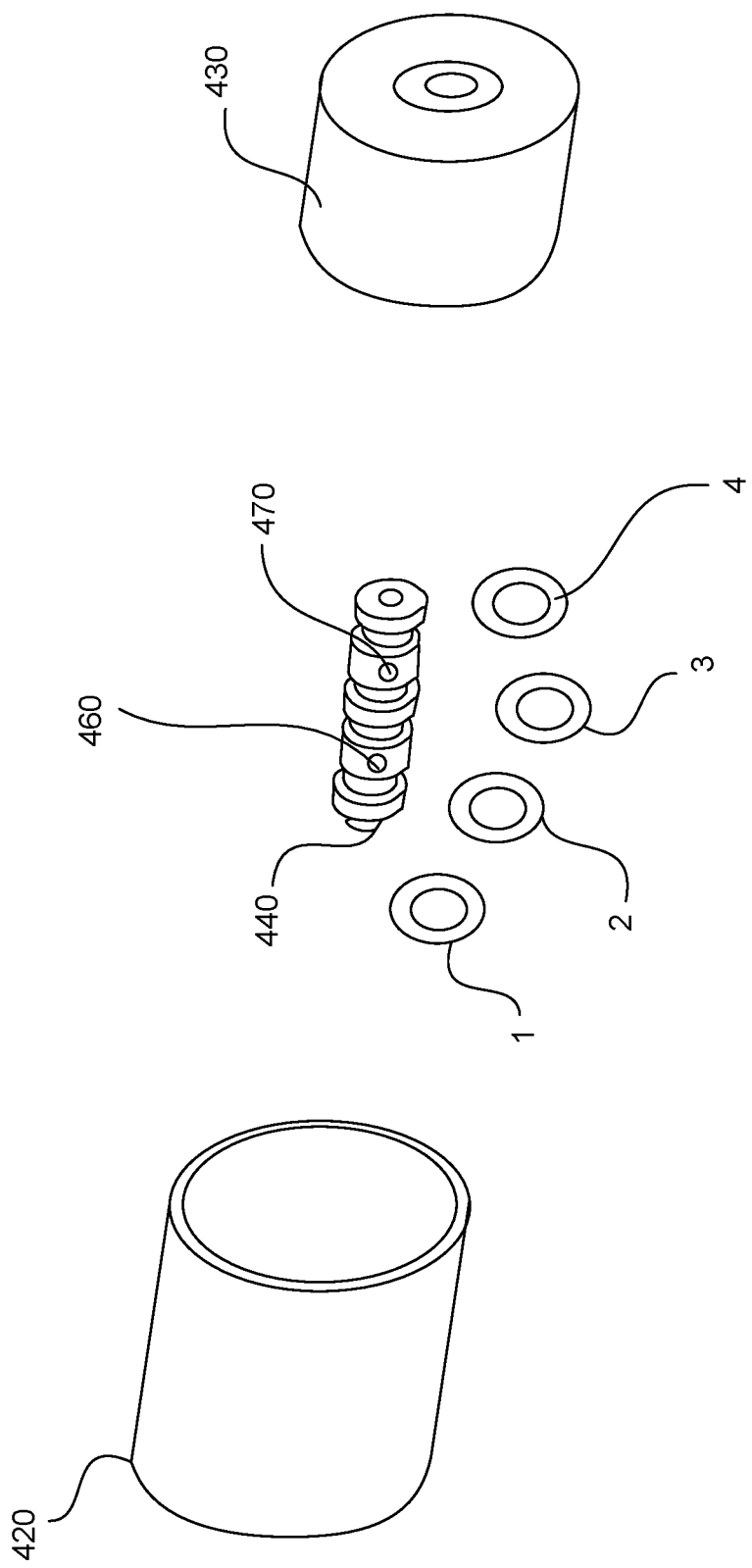
FIG. 3 is an exploded perspective view of an example external fuel metering valve, in accordance with implementations described herein.

An example external fuel delivery valve 400, or external fuel metering valve 400, externally coupled to a fuel canister 200 is shown in FIGS. 2A-2B. FIG. 3 is an exploded perspective view of the example external fuel metering valve 400 shown in FIGS. 2A-2B. In the example arrangement shown in FIGS. 2A-2B and 3, the first valve 300 may convey fuel from an interior of the canister 200 to the external fuel metering valve 400, for selective discharge to the combustion chamber 130 of the tool 100. In some implementations, fuel may be drawn from the interior of the canister directly into the first valve 300. In some implementations, fuel may be drawn from the interior of the canister 200, through a dip tube 220 and into the first valve 300.

As shown in FIGS. 2A-2B, in some implementations, the external fuel metering valve 400 may be selectively coupled to the fuel canister 200, and decoupled from the fuel canister 200, by a coupling device 500. The coupling device 500 may include a first coupler 520 coupled to the fuel canister 200, and a second coupler 540 coupled to a housing 550 in which the external fuel metering valve 400 is installed. One of the first coupler 520 or the second coupler 540 may be a quick disconnect male coupler providing for snap fit, twist lock, or other similar type attachment, and the other of the first coupler 520 or the second coupler 540 may be a corresponding or mating quick disconnect female coupler. In some implementations, the first coupler 520 may include a spring loaded or similar shut-off style valve that is depressed by mating the coupler 540 to open flow. In the example arrangement shown in FIG. 2A, the second coupler 540 is a quick disconnect male coupler, and the first coupler 520 is a quick disconnect female coupler, simply for ease of discussion and illustration. In some implementations, a coupling device 500 set with automatic locking and push button release may allow for rapid engagement between the first and second couplers 520, 540, and rapid connection of the external fuel metering valve 400 to the fuel canister 200 by inserting the second coupler 540 into the first coupler 520, as shown in FIG. 2B. This may also allow for rapid disengagement of the second coupler 540 from the first coupler 520, and rapid disconnect of the external fuel metering valve 400 from the fuel canister 200, by removing the second coupler 540 from the first coupler 520, as shown in FIG. 2A. An internal structure of the first coupler 520 and the second coupler 540 may allow for the flow of fuel from the fuel canister 200 into the external fuel metering valve 400 only when the first and second couplers 520, 540 are engaged. The first coupler 520 coupled to the fuel canister 200 may include a shutoff mechanism that blocks the flow of fuel out of the fuel canister 200 through the first coupler 520 when the first and second couplers 520, 540 are disengaged, as shown in FIG. 2A. In some implementations the external fuel metering valve 400 may be axially aligned with the first and second couplers 520, 540 and the fuel canister 200, so as to dispense fuel in an axial direction from the external fuel metering valve 400, as illustrated by the arrow pointing the opposite direction of F1 in FIG. 4B.

Figure 4A:
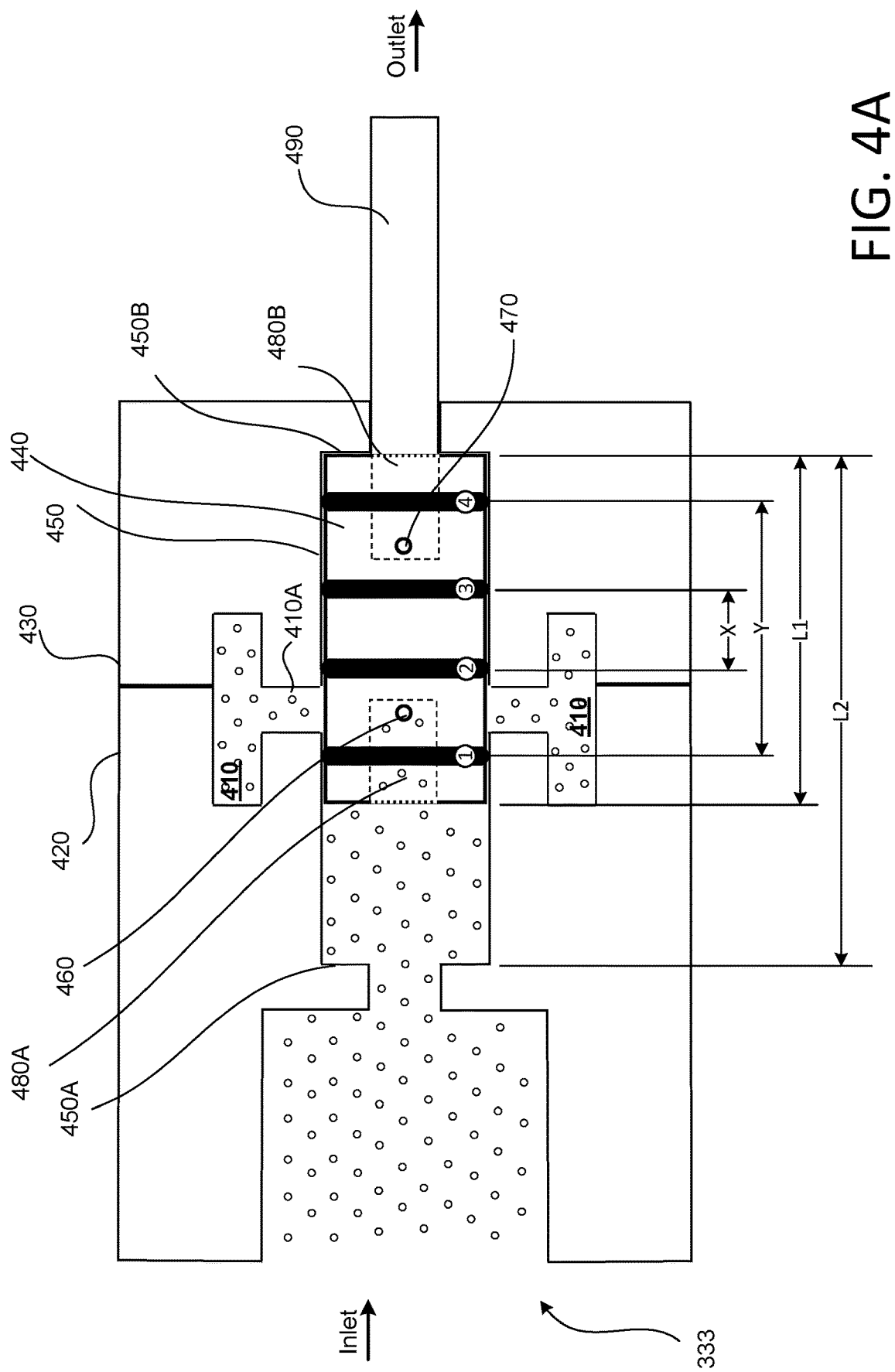
FIGS. 4A-4D illustrate fuel flow through an example fuel metering valve with a shuttle mechanism, in accordance with implementations described herein.

FIGS. 4A-4D are partial cutaway views of the external fuel metering valve 400, illustrating various stages of operation of the external fuel metering valve 400. FIG. 4A illustrates the external fuel metering valve 400 in a pressurized, or filled state. In the pressurized, or filled state, fuel is contained in a control volume, or a control space, ready to be dispensed in response to an actuation mechanism 120 of the tool 100 applying force F1 to the valve 400 in the direction of shuttle movement before and during dispense.

As shown in FIGS. 4A-4D, the external fuel metering valve 400 may include a valve cap 430 coupled to a main valve body 420. A shuttle 440 or piston 440, may be received within a chamber 450 defined within the valve main body 420/valve cap 430. In the example shown in FIGS. 4A-4D, a first portion of the cylindrical chamber 450 is defined by a recess, or bore in the main valve body 420, and a second portion of the cylindrical chamber 450 is defined by a recess, or a bore in the valve cap 430. With the valve cap 430 installed on the main valve body 420, the first portion and the second portion are axially aligned to define the cylindrical chamber 450 in the fuel metering valve 400. A plurality of seals, or dynamic sealing surfaces, such as, for example, O-rings, may be positioned on an outer circumferential surface of the shuttle 440, or piston 440. In the example shown in FIGS. 4A-4D, a first seal 1, a second seal 2, a third seal 3, and a fourth seal 4, are positioned on the outer circumferential surface of the shuttle 440, or piston 440. In this example, the first seal 1, or inlet end seal 1, may be positioned at an inlet end portion of the shuttle 440, the fourth seal 4, or outlet end seal 4, may be positioned at an outlet end portion of the shuttle 440, and the second and third seals 2, 3 may be positioned at an intermediate portion of the shuttle 440, between the first seal 1 and the fourth seal 4. Simply for ease of discussion and illustration, the chamber 450 shown in FIGS. 4A-4D is defined by a substantially cylindrical bore, and the shuttle 440, or piston 440, is substantially cylindrical, corresponding to the chamber 450. However, in some implementations, the chamber 450 may have other contours, or cross sections, based on a contour or a cross section of the shuttle 440 to be received in the chamber 450, and allowing for engagement between the seals 1, 2, 3, 4, or surfaces of other types of sealing devices provided on the shuttle 440, with the inner surface of the chamber 450 to be described herein.

A geometry of the shuttle 440 (for example, cross sectional area/cross sectional shape, and other parameters associated with the geometry of the shuttle 440 and its interaction with the chamber 450) may be determined based on operating parameters critical to the proper operation of the shuttle 440 in the chamber 450 (to be described in more detail below). For example, given that pressure is a measure of force divided by area, and force is the product of mass and acceleration, cross-sectional area of the shuttle 440 may be governed by following;

if
    shuttle retaining forces=frictional forces+[(mass of shuttle)*(acceleration of gravity)]
then
    (cross-sectional area*fuel pressure)>shuttle retaining forces
and
    [(cross-sectional area*fuel pressure)+(shuttle retaining forces)]<actuation force (F1)

Determination of the cross sectional area of the shuttle 440 in this manner may allow operation of the shuttle 440 in the chamber 450 that provides for proper operation and biasing of the shuttle 440 in the chamber 450 without additional biasing members such as springs and the like. Though springs may, in some implementations, be included to assist the biasing of shuttle 440, springs are not necessary if the shuttle 440 is designed in accordance with the parameters as described above. Proper design of the shuttle 440 is critical to successful operation of the shuttle in the manner to be described.

In this arrangement, at least three of the four seals 1, 2, 3, 4, or dynamic sealing surfaces, will be engaged with an inner peripheral portion of the chamber 450 at any one time. During an intermediate, transitional state, all four of the seals 1, 2, 3, 4, or dynamic sealing surfaces, will be engaged with the inner peripheral portion of the chamber 450. In the sequence of operation illustrated in FIGS. 4A-4D, the fluid dispensed by the external fuel metering valve 400 and refilled into the external fuel metering valve 400 is illustrated by a pattern of dots in the respective portions of the external fuel metering valve 400, simply for clarity.

A central inlet passage 480A of the shuttle 440 may extend to a control space inlet passage 460. A control space outlet passage 470 may extend through a second wall portion of the shuttle 440, to a central outlet passage 480B. A length L2 of the cylindrical chamber 450 may be greater than a length L1 of the shuttle 440, to allow for axial movement of the shuttle 440 within the chamber 450. The control space 410 may be defined by a void formed within the main valve body 420/valve cap 430. In some implementations, a volume of the control space 410 may correspond to a previously defined volume of fuel to be dispensed from fuel originating in the canister 200.

As noted above, in some implementations, the discharge of the previously defined amount of fuel from the fuel metering valve 400 may be controlled based on, for example, a volume of the control space 410, such that substantial portion of the fuel contained in the control space 410 is discharged in response to actuation. The geometry of the control space 410 may define a predetermined and fixed volume. In some implementations, the volume of the control space 410 may be manually adjusted in response to user input. In some implementations, the discharge of the previously defined amount of fuel from the external fuel metering valve 400 may be controlled based on, for example, an amount of open time of the valve 400, a fuel flow rate/discharge rate of the fuel metering valve 400, and other such factors. Hereinafter, simply for ease of discussion and illustration, the external fuel metering valve 400 will be discussed with respect to operation in which a volume of the control space 410 corresponds to the previously defined amount, or volume, of fuel to be dispensed.

A geometry of the shuttle 440 (for example, shuttle length, O-ring spacing, inlet spacing, control valve opening, and other parameters associated with the geometry of the shuttle 440 and its interaction with the chamber 450) may be determined based on operating parameters critical to the proper operation of the shuttle 440 in the chamber 450 (to be described in more detail below). For example, the length of the shuttle 440, the length of the shuttle chamber 450, and the diameter or length of the control space port 410A in a symmetric design would follow the parameters outlined below for successful operation. This assumes reflective symmetry of the shuttle 440 along the midpoint in the length direction, or in the direction of travel, as well as respective alignment of midpoints for the port 410A and the chamber 450. In the example shown in FIG. 4A, a distance X is defined as the distance between respective sealing surfaces of the second seal 2 and the third seal 3. The engagement of the second seal 2 and the third seal 3 with the chamber 450 may be otherwise defined as forming the inner sealing surfaces adjacent to the control space inlet 460 and outlet 470 passage, respectively. Similarly, the distance Y may be defined as the distance between respective sealing surfaces of the first seal 1 and the fourth seal 4, but may otherwise defined as the outermost sealing surfaces of the shuttle 440 as shown in FIG. 4A. If the distance X is greater than or equal to the diameter of the port 410A, then a relationship may be defined for both L1 and L2 with respect to X, according to Equation 1:

$$L1 + \frac{X}{2} \le L2 \qquad \text{Equation 1}$$

That is, the length L2 of the chamber 450, or the distance between the first lateral wall 450A and the second lateral wall 450B of the chamber 450, may be greater than or equal to the length L1 of the shuttle 440 plus X/2 for a minimum length L2 of the chamber 450. The exemplary geometry of a chamber 450 having a length L2 equal to about L1+2X shown in FIGS. 4A-4D provides sufficient clearance for the shuttle 440 to successfully transition between states. A maximum length L2 of the chamber 450 may also be defined with respect to Y, according to Equation 2:

$$L2 \le \frac{L1 - Y}{2} + 2Y \qquad \text{Equation 2}$$

Equation 1 may define a minimum length L2 for the chamber 450 based on a geometry of the shuttle 440, with the chamber 450 and shuttle 440 being substantially symmetric in direction of shuttle 440 movement. Equation 2 may define a maximum length L2 of the chamber 450 based on a geometry of the shuttle 440, the chamber 450 and shuttle 440 being substantially symmetric in direction of shuttle 440 movement. Relative lengths of the chamber 450 and shuttle 440 may fall outside of the relationships defined by Equations 1 and 2 for a non-symmetric, or asymmetric, chamber 450 and shuttle 440 as well as non-alignment of midpoints for the shuttle 440, chamber 450, and control space port 410A.

Figure 4B:
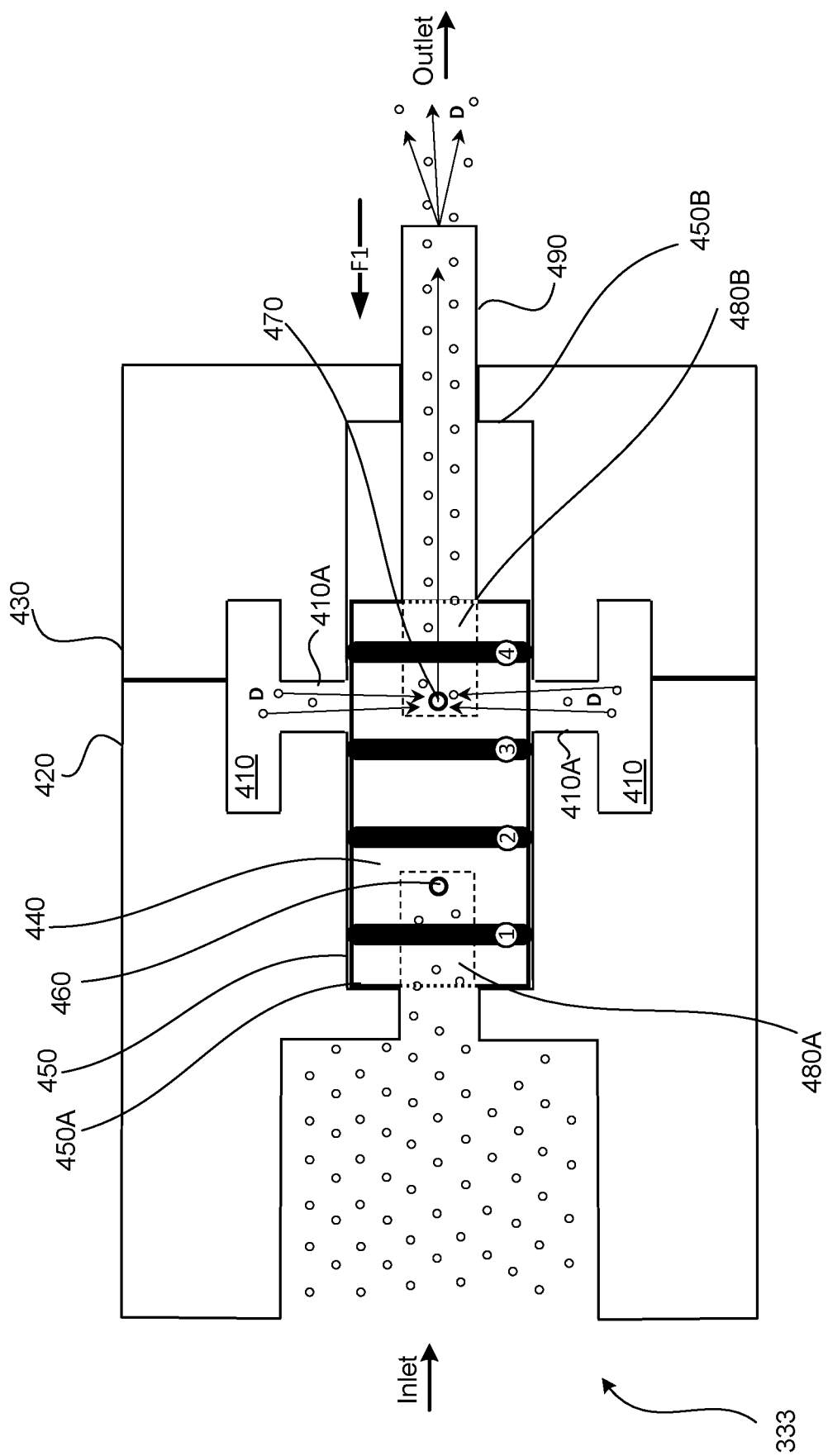

In the example arrangement shown in FIG. 4B, the external fuel metering valve 400 is in a dispensing position, in which the shuttle 440 has moved from the normally closed pressurized position shown in FIG. 4A, and is in first position relative to the chamber 450. In this first position of the shuttle 440, fuel contained within the control space 410, is discharged (for example, to the combustion chamber 130 of the tool 100 as described in the example above). The first seal 1 and the second seal 2 are in contact with the main valve body 420, and the fourth seal 4 is in contact with the valve cap 430. In the arrangement shown in FIG. 4B, the third seal 3 is engaged with the valve body 420. However, in some situations, the third seal 3 may not necessarily be engaged with the valve body 420. In FIG. 4B, the shuttle 440 has been biased into the first position relative to the cylindrical chamber 450 in response to actuation force on the outlet valve stem 490. Actuation of the valve stem 490 may occur in response to depression of the nose 110 against the workpiece, as described above. Thus, depression of the nose 110 of the tool 100 against the workpiece may exert an actuation force F1 at the valve stem 490, causing the shuttle 440 to move into the first position, in which a first end of the shuttle 440 is pressed against a first lateral wall 450A of the chamber 450. In this position, the pressurized fluid available at the inlet passage 460 is blocked from entering control space 410 by the second seal 2. In the first position shown in FIG. 4B, the discharge flow path from the control space 410 to the outlet passage 470 is open. This allows fuel contained in the control space 410 to flow out of the control space 410, through a control space port 410A and the outlet passage 470 between the third and fourth seals 3, 4, and out of the valve 400 through the valve stem 490, as illustrated by the arrows D in FIG. 4B. The shuttle 440 may remain in the first position relative to the chamber 450 until the force F1 applied by the tool actuation mechanism 120 is relieved. Release of the actuation force F1, and remaining force exerted by gas pressure may cause the shuttle 440 to move from the first position shown in FIG. 4B, thru a transitional state shown in FIG. 4C, and towards a second position shown in FIG. 4D.

In the first position described above with respect to FIG. 4B, substantially all of the fuel contained in the control space 410 may be dispensed in response to the actuation of the valve stem 490. In this example, the amount, or volume, of fuel contained in the control space 410 and dispensed as described above corresponds to a previously defined amount, or volume, of fuel. The previously defined amount, or volume of fuel may be correspond to an amount of fuel required to generate a force from combustion in the combustion chamber 130 of the tool 100 needed to drive the piston 160 in the cylinder 165, and drive the fastener 180 into the workpiece, as described above.

Figure 4C:
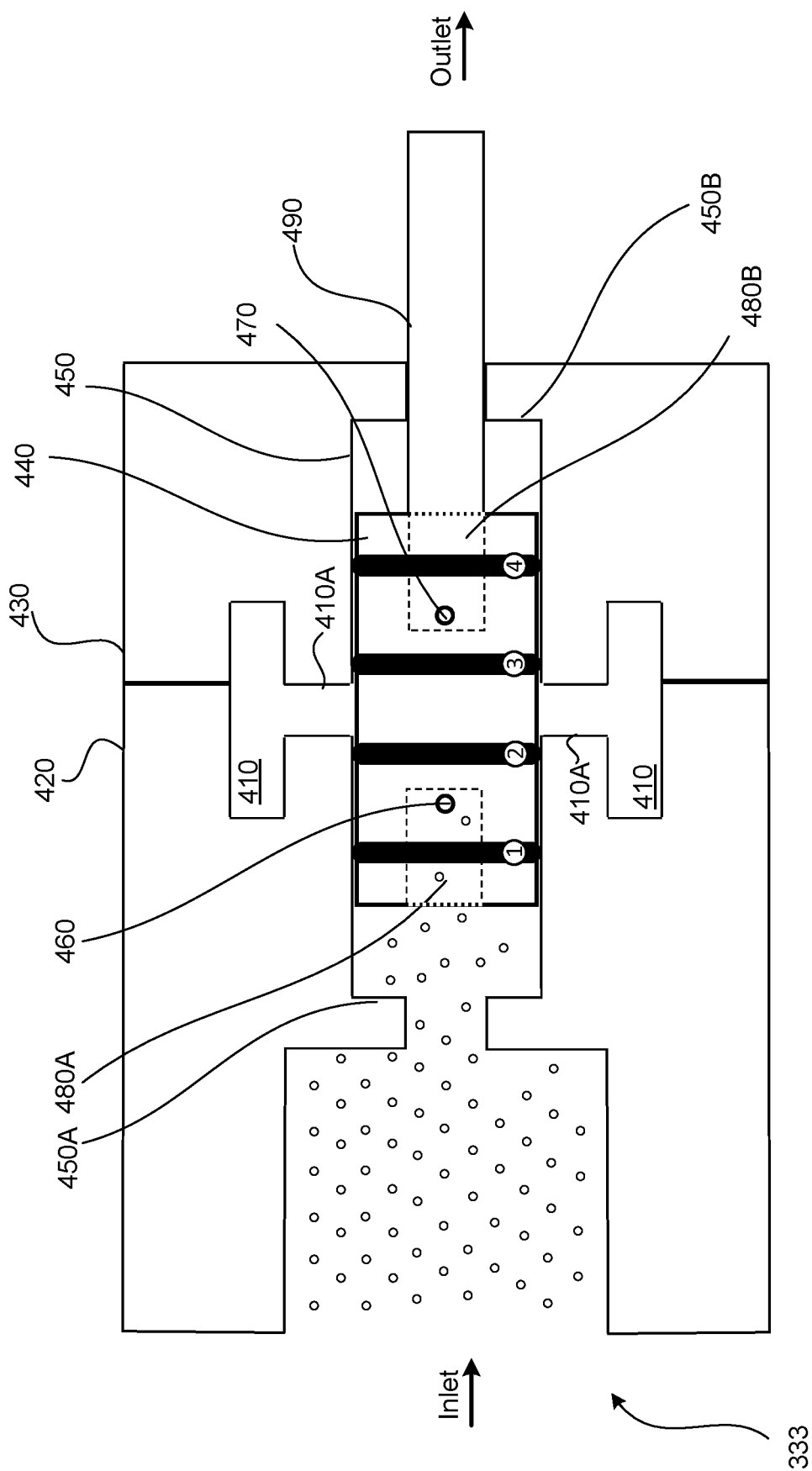

In the example arrangement shown in FIG. 4C, the fuel metering valve 400 is in a transitional state, in which the shuttle 440 is between filling and dispensing states. In FIG. 4C, the shuttle 440 is in an interim position with respect to the chamber 450, and is moving from the first position shown in FIG. 4B, to a second position shown in FIG. 4D or from the second position to the first position. In the interim position shown in FIG. 4C, the first seal 1, the second seal 2, the third seal 3 and the fourth seal 4 are all engaged with the inner peripheral wall of the chamber 450. In the example shown in FIG. 4C, the first and second seals 1, 2 are engaged with, or in contact with, the main valve body 420, and the third and fourth seals 3, 4 are engaged with, or in contact with, the valve cap 430. In this particular interim position (in which the shuttle 440 is moving between the first position shown in FIG. 4B and the second position shown in FIG. 4D, or between the second position shown in FIG. 4D and the first position shown in FIG. 4B), the three main regions of the fuel delivery valve 400 are isolated from one another. That is, in this interim position, the inlet passage 460 and the outlet fluid passage 470 are isolated from the control space 410. For example, as shown in FIG. 4C, the contact of the first and second seals 1, 2 with the main valve body 420 essentially close, or seal off, or isolate, the inlet passage 460 to the control space 410. Similarly, the contact of the third and fourth seals 3, 4 with the valve cap 430 essentially close, or seal off, or isolate, the outlet passage 470 from receiving fuel from the control space 410 and/or discharging fuel from the valve 400.

Figure 4D:
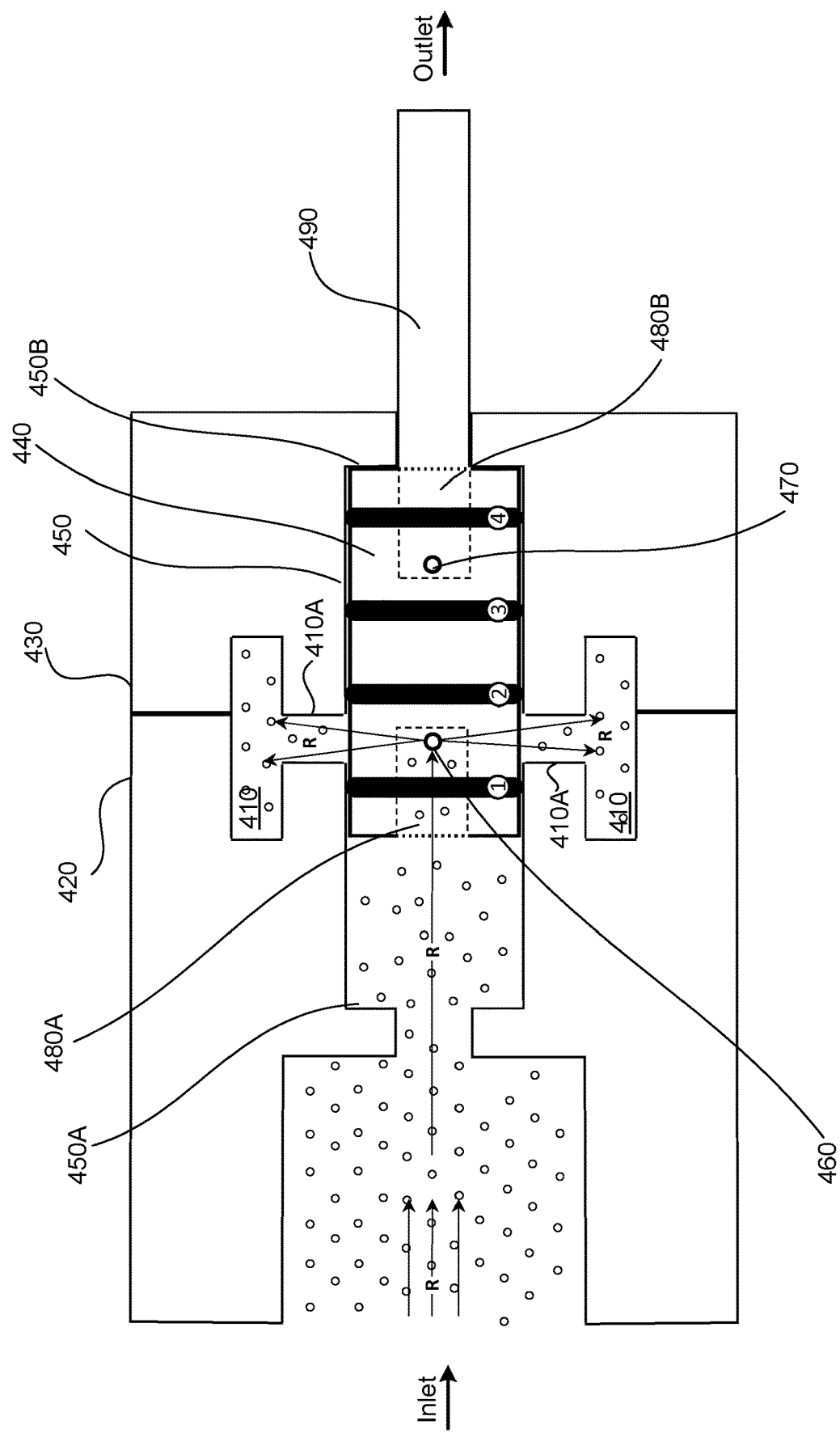

In the example arrangement shown in FIG. 4D, the external fuel delivery valve 400 is in a filling position, in which the shuttle 440 is in the second position with respect to the chamber 450. This may also be known as the normally closed position of the external fuel metering valve 400. In the second position, the first seal 1 is engaged, or in contact with, the inner peripheral surface of the chamber 450 at the main valve body 420. In the second position, the third and fourth seals 3, 4 are engaged, or in contact with, the inner peripheral surface of the chamber 450 at the valve cap 430, blocking fluid flow from the control space 410 to the outlet passage 470. In the arrangement shown in FIG. 4D, the second seal 2 is engaged with the valve cap 430. However, in some situations, the second seal 2 may not necessarily be engaged with the valve cap 430. In the filling position, or the second position of the shuttle 440 in the chamber 450, the filling flow path into the control space 410 is open to the inlet passage 460. Fuel may be supplied, for example, from the canister 200 into the external fuel metering valve 400. From the central inlet passage 480A, fuel may flow through the inlet passage 460 and into the control space 410 through the control space port 410A, as shown by the arrows R in FIG. 4D. FIG. 4D illustrates the filling of the control space 410 at an interim point, in which the filling process is ongoing and the control space 410 is partially filled with fluid (i.e., a liquid/gaseous fuel mixture). The filling process may be continued until the control space 410 is filled and fully charged, or pressurized, as shown in FIG. 4A.

When in the filling position, a pressure differential between the pressure in the canister 200 and a pressure in the evacuated control space 410 may draw fuel from the canister 200 into the control space 410, causing the fuel to fill the control space 410. Filling of the control space 410 may be complete when a pressure between the canister 200 and the external fuel metering valve 400 is essentially equalized and there is no further space to be filled in the control space 410. Pressure in the canister 200 may also force the shuttle 440 to move in the chamber 450, in a direction away from the canister 200 (i.e., in a direction toward the second lateral wall 450B of the chamber 450), biasing the shuttle 440 into the second position shown in FIG. 4D, and opening the flow path through the inlet passage 460 into the control space 410 through the control space port 410A. This pressure from the canister 200 may maintain the shuttle 440 in the second position, allowing fuel to flow through the inlet passage 460 and into the control space 410 until filling of the control space 410 has been completed.

In the example shown in FIG. 4C, the shuttle 440 is moving in the chamber 450, from the first position shown in FIG. 4B, to the second position shown in FIG. 4D (i.e., from a position adjacent to the first lateral wall 450A of the chamber 450 toward the second lateral wall 450B of the chamber 450). In this example, fuel has been dispensed from the control space 410 (as described above with respect to FIG. 4B), and because the inlet fuel passage 460 is still isolated, the control space 410 has not yet been refilled with fuel. It is noted that the shuttle 440 may also be in this transitional state, with the shuttle 440 positioned in the chamber 450 as shown in FIG. 4C, with the control space 410 pressurized and filled with fuel. This may occur when the shuttle 440 is moving in the chamber 450, from the filled second position shown in FIG. 4D to the first position shown in FIG. 4B (i.e., from a position adjacent to the second lateral wall 450B of the chamber 450 toward the first lateral wall 450A of the chamber 450) in accord with how the fuel metering valve 400 is actuated in the tool 100. In this scenario, the fluid flow is being limited in both directions until reaching the first position shown in FIG. 4B.

Figure 5B:
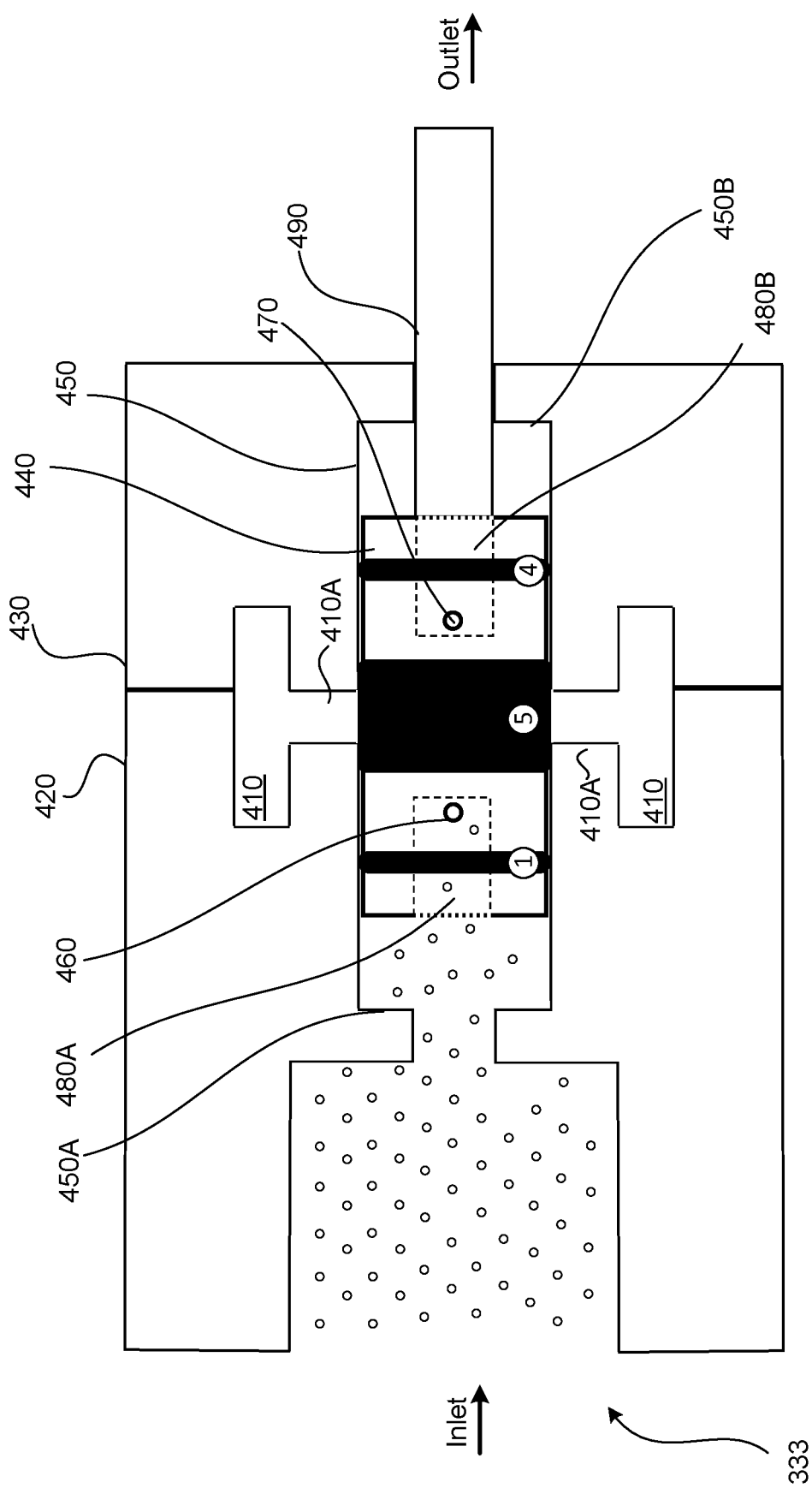
Figure 5C:
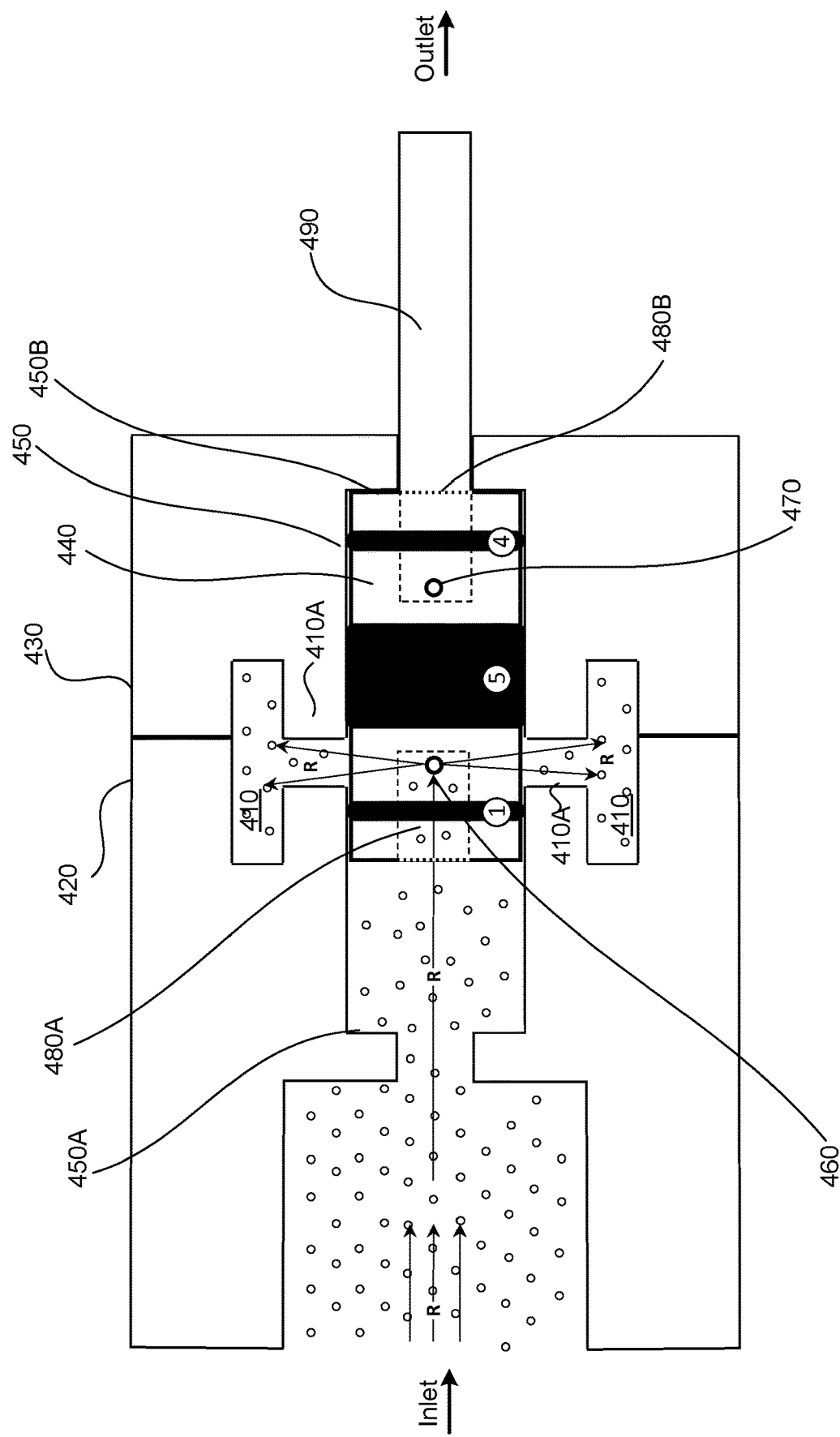

As shown in FIGS. 5A-5C, in some implementations, the plurality of seals positioned on the outer circumferential surface of the shuttle 440 may include an inlet end seal 1 positioned at an inlet end portion of the shuttle 440, an outlet end seal 4 positioned at an outlet end portion of the shuttle 440, and an intermediate seal 5 positioned at an intermediate portion of the shuttle 440, between the inlet end seal 1 and the outlet seal 4. In this arrangement, the intermediate seal 5 may have a dimension, for example, a width, which is greater than the opening defining the control space port 410A. This may allow the flow of fluid through the valve 400 to be controlled in a manner similar to that described above with respect to FIGS. 4A-4D, but using three seals 1, 4 and 5, or three dynamic sealing surfaces, rather than four seals (as described above with respect to FIGS. 4A-4D). That is, in this arrangement, the intermediate seal 5 may span across the opening into the control space port 410A in the transient position shown in FIG. 5B, when the shuttle 440 is in a transient position in the chamber 450 between the first position shown in FIG. 5A and the second position shown in FIG. 5C. The span of the intermediate seal 5 across the opening into the control space port 410A may form a seal between the flow path inlet 460 and the flow path outlet 470, as described above. In the arrangement shown in FIGS. 5A-5C, in which a minimal number of seals are employed, the distance X may be defined as the distance, or width of the intermediate seal 5, and the distance Y may be defined as the distance between the inlet end seal 1 and the outlet end seal 4. In this arrangement, the length L2 of the chamber 450 may be defined by:

$$L1 + \frac{X}{2} \leq L2 \leq \frac{L1 - Y}{2} + 2Y \qquad \text{Equation 3}$$

This single intermediate seal 5 may replace the second and third seals 2, 3 described above with respect to FIGS. 4A-4D, spaced apart a distance X greater than a corresponding dimension of the control space port 410A, so as to simultaneously stop the flow into and out of the control space port 410A at critical point(s) during transition, and prevent a flow through condition when in the transient condition.

In an external fuel metering valve, and a combustion powered tool including a fuel metering valve, in accordance with implementations described herein, a previously defined amount, or volume, of fuel, may be consistently and accurately supplied to a control space of the valve, and may be consistently and accurately dispensed in response to an actuation mechanism. Movement of a shuttle within a cylindrical passage of the valve, may alternately open and close the metering valve in reciprocating fashion to deliver fuel to the tool. Movement of the shuttle within the cylindrical passage of the valve may also selectively open and close and outlet passage in the valve, to dispense a metered amount of fuel from the control space for combustion in a combustion chamber of the tool. In some implementations, a quick disconnect coupling assembly may provide for the connection of the external fuel supply valve to the canister as well as disconnect of the external fuel metering valve from the canister. However, other attachment mechanisms of the external metering valve to the fuel cell canister outlet can also be embodied such as snap fit, twist lock, clip in, and the like. A fuel metering valve, in accordance with implementations described herein, may provide for reliable, simple, and cost effective prescribed fuel delivery from a fuel canister to a combustion powered tool.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An external fuel metering valve, comprising:
a main valve body;
a valve cap coupled to the main valve body;
a chamber, including:
    a first portion defined in the main valve body; and
    a second portion defined in the valve cap, axially aligned with the first portion;
a control space connected to the chamber; and
a shuttle movably positioned in the chamber, between
    a first position, in which a discharge flow path from the control space through the shuttle and an outlet of the valve cap is open; and
    a second position, in which a filling flow path from an inlet of the main valve body through the shuttle and into the control space is open.

2. The valve of claim 1, wherein the shuttle includes:
an inlet flow passage in fluid communication with an inlet of the main valve body;
an outlet flow passage in fluid communication with an outlet of the valve cap; and
a plurality of seals each positioned on a corresponding outer circumferential portion of the shuttle so as to selectively engage a corresponding inner peripheral portion of the chamber.

3. The valve of claim 2, wherein the plurality of seals includes:
an inlet end seal;
at least one intermediate seal; and
an outlet end seal,
wherein
    the inlet end seal, the at least one intermediate seal and the outlet end seal are sequentially arranged on the outer circumferential portion of the shuttle,
    the inlet flow passage is positioned between the inlet end seal and the at least one intermediate seal, and
    the outlet flow passage is positioned between the at least one intermediate seal and the outlet end seal.

4. The valve of claim 3, wherein, in a transitional position between the first position and the second position of the shuttle in the chamber, the inlet end seal, the at least one intermediate seal, and the outlet end seal are engaged against the inner peripheral portion of the chamber, to block the filling flow path, and to block the discharge flow path, and to maintain a state of fuel in the control space.

5. The valve of claim 4, wherein, in the transitional position of the shuttle in the chamber,
    the inlet end seal is positioned in the first portion of the chamber corresponding to the main valve body, and is engaged against the inner peripheral portion of the first portion of the chamber,
    the outlet end seal is positioned in the second portion of the chamber corresponding to the valve cap and is engaged against the inner peripheral portion of the second portion of the chamber, and
    the at least one intermediate seal is positioned between the inlet end seal and the outlet end seal, and is engaged against the inner peripheral portion of a corresponding portion of the chamber.

6. The valve of claim 5, wherein the inlet flow passage is positioned between the inlet end seal and the at least one intermediate seal, and the outlet flow passage is positioned between the at least one intermediate seal and the outlet end seal.

7. The valve of claim 2, wherein the plurality of seals includes a first seal, a second seal, a third seal and a fourth seal sequentially arranged on the outer circumferential portion of the shuttle, and
    wherein the inlet flow passage is positioned between the first seal and the second seal, and the outlet flow passage is positioned between the third seal and the fourth seal.

8. The valve of claim 7, wherein in the first position of the shuttle in the chamber, the first seal, the second seal and the fourth seal are engaged against the inner peripheral portion of the chamber, and the third seal is disengaged from the inner peripheral portion of the chamber so as to open the discharge flow path from the control space to the outlet flow passage, and to block the filling flow path.

9. The valve of claim 7, wherein, in the second position of the shuttle in the chamber, the first seal, the third seal and the fourth seal are engaged against the inner peripheral portion of the chamber corresponding to the valve cap, and the control space is open to the filling flow path from the inlet flow passage through the shuttle, and to block the discharge flow path from the shuttle.

10. The valve of claim 9, wherein in the second position of the shuttle in the chamber,
the first seal is positioned in the first portion of the chamber corresponding to the main valve body and is engaged against the inner peripheral portion of the first portion of the chamber, and
the third seal and the fourth seal are positioned in the second portion of the chamber corresponding to the valve cap and are engaged against the inner peripheral portion of the second portion of the chamber, and the filling flow path is open to the control space.

11. The valve of claim 1, wherein the shuttle also includes:
a central inlet passage in fluid communication with an inlet into the main valve body; and
a central outlet passage in fluid communication with an outlet of the valve cap.

12. The valve of claim 11, wherein
the central inlet passage and the central outlet passage extend axially in the shuttle,
an inlet flow passage extends radially outward from the central inlet passage of the shuttle to a corresponding outer circumferential portion of the shuttle; and
the outlet flow passage extends radially outward from the central outlet passage to a corresponding outer circumferential portion of the shuttle.

13. The valve of claim 1, wherein the chamber is substantially cylindrical, the chamber including:
an inlet at a first axial end of the chamber, wherein the inlet connects a central inlet passage of the shuttle to a pressurized source of fuel; and
an outlet at a second axial end of the chamber, wherein the outlet is connected with an outlet flow passage of the shuttle, and wherein
the control space is defined by a void surrounding the chamber, and
a volume of fuel metered by the valve is defined by an internal geometry of the void.

14. A fuel delivery system for a combustion-powered tool, comprising:
a fuel canister; and
an external fuel metering valve externally coupled to the fuel canister, the external fuel metering valve including:
a main valve body;
a valve cap coupled to the main valve body;
a chamber defined within the main valve body and the valve cap;
a control space defined in at least one of the main valve body or the valve cap, the control space being in fluid communication with the chamber; and
a shuttle movably installed in the chamber, wherein
in a first position of the shuttle in the chamber, a discharge flow path from the control space through the shuttle and an outlet of the valve cap is opened in response to an external force; and
in a second position of the shuttle in the chamber, a filling flow path is opened to the control space.

15. The fuel delivery system of claim 14, further comprising:
an inlet flow passage at a first end portion of the shuttle, the inlet flow passage providing for fluid communication between the fuel canister and the control space; and
an outlet flow passage at a second end portion of the shuttle, the outlet flow passage providing for fluid communication between the control space and an outlet of the valve.

16. The fuel delivery system of claim 15, wherein,
in the first position of the shuttle in the chamber, the filling flow path from an inlet of the main valve, through the inlet flow path, and into the control space is closed; and
in the second position of the shuttle in the chamber, the discharge flow path is closed in response to a differential between pressure exerted on the shuttle and a lack of pressure at an outlet stem of the valve.

17. The fuel delivery system of claim 16, wherein
the shuttle is biased into the second position in response to a pressure differential between an inlet pressure at an inlet of the valve and an outlet pressure at an outlet of the valve, and
the shuttle is moved from the second position in response to an actuation force on the valve.

18. The fuel delivery system of claim 14, wherein the fuel metering system further comprises:
a coupling device that selectively couples and de-couples the external fuel metering valve to the fuel canister, the coupling device including:
a first coupler fixedly coupled to the fuel canister; and
a second coupler fixedly coupled to the external fuel metering valve, and configured to selectively engage the first coupler so as to couple the external fuel metering valve to an exterior of the fuel canister, wherein
engagement of the first coupler and the second coupler allows fuel to flow from the fuel canister into the external fuel metering valve, and
disengagement of the first coupler and the second coupler restricts the flow of fuel from the fuel canister.

19. The fuel delivery system of claim 14, wherein the chamber is substantially cylindrical, the chamber including:
an inlet at a first axial end of the chamber, wherein the inlet connects a central inlet passage of the shuttle to a pressurized source of fuel; and
an outlet at a second axial end of the chamber, wherein the outlet is connected with an outlet flow passage of the shuttle, and wherein
the control space is defined by a void surrounding the chamber, and
a volume of fuel metered by the valve is defined by an internal geometry of the void.

20. The fuel delivery system of claim 19, wherein
the central inlet passage is oriented axially in the shuttle,
a central outlet passage oriented axially n the shuttle is in fluid communication with the outlet of the valve cap,
an inlet flow passage extends radially outward from the central inlet passage to a corresponding outer circumferential portion of the shuttle, and
the outlet flow passage extends radially outward from the central outlet passage to a corresponding outer circumferential portion of the shuttle.

* * * * *